United States Patent [19]

Zackay et al.

[11] Patent Number: 4,474,739

[45] Date of Patent: Oct. 2, 1984

[54] METHOD FOR REMOVING GASEOUS POLLUTANTS IN HIGHLY DILUTE CONCENTRATIONS FROM AIR AT ROOM TEMPERATURES

[75] Inventors: Victor F. Zackay, New Canaan, Conn.; William G. Lloyd; Donald R. Rowe, both of Bowling Green, Ky.; John M. Trenary; Gerald T. Swanson, both of Fort Collins, Colo.

[73] Assignee: Teledyne Industries, Inc., Fort Collins, Colo.

[21] Appl. No.: 508,855

[22] Filed: Jun. 29, 1983

[51] Int. Cl.$^3$ .............................................. B01D 53/36
[52] U.S. Cl. .................................... 423/230; 423/236; 423/402; 423/573 G
[58] Field of Search ............... 423/224, 230, 236, 400, 423/402, 405, 573 G

[56] References Cited

U.S. PATENT DOCUMENTS

| | | | |
|---|---|---|---|
| 2,743,153 | 4/1956 | Marsh et al. | 423/236 |
| 3,790,662 | 2/1974 | Lloyd et al. | 423/437 |
| 3,849,336 | 11/1974 | Lloyd et al. | 502/165 |
| 3,859,415 | 1/1975 | Nicklin et al. | 423/236 |
| 3,988,423 | 10/1976 | Ohrui et al. | 423/236 |
| 4,310,497 | 1/1982 | Deschamps et al. | 423/230 |

Primary Examiner—Earl C. Thomas
Attorney, Agent, or Firm—Ralph F. Crandell

[57] ABSTRACT

Hydrogen sulfide and hydrogen cyanide are catalytically removed from air at room temperatures. Air containing $H_2S$ and HCN in dilute concentrations is contacted with a dry, activated catalyst formed of palladium (II) and copper (II) salts such as chlorides, on an alumina substrate, at a temperature in the range of $-20°$ C. to $85°$ C. The catalyst may also contain nickel (II) chloride.

6 Claims, No Drawings

METHOD FOR REMOVING GASEOUS POLLUTANTS IN HIGHLY DILUTE CONCENTRATIONS FROM AIR AT ROOM TEMPERATURES

FIELD OF THE INVENTION

The present invention relates to an improved method for reducing gaseous pollutants present in highly dilute concentrations in air at ambient room temperatures. More specifically, the present invention relates to the removal of certain common cigarette smoke pollutants, particularly hydrogen sulfide and hydrogen cyanide, from ambient air.

BACKGROUND OF THE INVENTION

DESCRIPTION OF THE PRIOR ART

It is known that carbon monoxide can be oxidized to carbon dioxide and that sulfur dioxide can be oxidized to sulfur trioxide by contact, in dilute concentrations in air, with an oxidation catalyst containing palladium (II) and copper (II) halide salts in a solution or on a substrate or support such as alumina. Such catalysts are described in considerable detail in U.S. Pat. No. 3,790,662, issued Feb. 5, 1974, to Larox Research Corporation for "Palladium Compositions Suitable As Oxidation Catalysts", in U.S. Pat. No. 3,849,336, issued Nov. 19, 1974, to Larox Research Corporation for "Palladium Compositions Suitable As Oxidation Catalyst", and in copending application of Victor F. Zackay and Donald R. Rowe, Ser. No. 504,517 filed June 15, 1983 for "Improved Palladium Catalyst". The disclosures of these patents and application are incorporated herein and made a part of this specification by this reference.

Two major sources of pollution are cigarette smoke and automobile exhaust. Both of these sources produce gaseous pollutants which include hydrogen sulfide and hydrogen cyanide. These compositions are notable irritants even in dilute concentrations in air at normal or ambient temperatures which range generally from about $-20°$ C. to about 50° C. Gaseous pollutants such as hydrogen sulfide and hydrogen cyanide are present in cigarette smoke at irritant levels, and in closed or confined areas, gases such as hydrogen cyanide can be present at levels which could be life threatening. Hydrogen cyanide is, in terms of toxicological impact, probably the most critical component of cigarette smoke next to carbon monoxide. Hydrogen sulfide occurs at a highly irritant level in smoke. Research has determined that hydrogen sulfide can be present in cigarette smoke in amounts as low as 40 parts per million and as high as 160 parts per million. Hydrogen cyanide has been discovered at concentrations as low as 25 parts per million and as high as 1,000 parts per million. "Smoking and Health" U.S. Public Health Service Publication No. 1103, Department of Health, Education and Welfare, Washington, D.C., 1964; "Smoking and Health" report of the Surgeon General of the United States, U.S. Public Health Service, 1979; "Smoking and Health" W. H. Griest et al., Oakridge National Laboratory Report ORNL/TM-6144/PL, 1977; and "Smoking and Health" A. D. Horton et al., J. Chromatography, 90, 63–70 (1974). Heretofore there has been no known way to remove hydrogen sulfide and hydrogen cyanide in low concentrations from air at ambient temperatures other than by the use of wet alkaline scrubbers.

OBJECTS AND SUMMARY OF THE INVENTION

It is the principal object of the present invention to provide an improved catalytic method of removing both hydrogen cyanide and hydrogen sulfide when present in dilute concentrations in air.

A more specific object is to provide a catalyst capable of oxidizing hydrogen sulfide and hydrogen cyanide when present in highly dilute concentrations in air.

A further object of the invention is to provide an improved method of removing hydrogen cyanide and hydrogen sulfide from air contaminated with cigarette smoke or automobile exhaust at ambient room or surrounding temperatures.

In accordance with the foregoing objects and as described below in further detail, the present invention contemplates a method and composition for removing gaseous hydrogen sulfide, hydrogen cyanide, or mixtures thereof from highly dilute concentrations thereof in air. The method comprises contacting the gas and air mixture with a catalyst comprising a palladium (II) salt and a copper (II) salt, the salts preferably being the halides. The salts are carried on a solid support, such as alumina particles or alumina substrate which has been soaked in a solution of the salts, dried, and thereafter activated by heating at a temperature of approximately 200° C. It has further been observed that an optimum concentration of approximately 0.080 gram-moles palladium per liter of impregnating solution, or 0.03 gram-atoms palladium per kilogram of alumina is highly effective for the purposes of this invention. It is expected that the concentration of gases in the air will be highly dilute and the method of this invention is effective at room or ambient temperatures ranging from approximately $-20°$ C. to about 50° C.

The catalytic composition is prepared as described in U.S. Pat. No. 3,790,662, and 3,849,336, and copending application Ser. No. 504,517. Hydrogen sulfide is effectively removed for example at ambient room temperatures at concentrations of about 6 ppm and a time of contact of 0.200 seconds. Hydrogen cyanide is effectively removed for example at ambient room temperatures, and even up to temperatures as high as 400° C., in concentrations of about 10,000 ppm at a contact time of about 0.270 seconds.

DESCRIPTION OF THE PREFERRED EMBODIMENT

Highly dilute concentrations of hydrogen sulfide or hydrogen cyanide, and mixtures thereof in air can be removed, at ambient room temperatures, by contact with solid palladium containing catalysts. Catalysts for use in connection with the present invention are prepared as described in U.S. Pat. No. 3,790,662, U.S. Pat. No. 3,849,336, and Application Ser. No. 504,517, by dissolving palladium (II) chloride, copper (II) chloride, and nickel (II) chloride if desired, in water at about 20° to 25° C. The amount of palladium (II) chloride may run from about 0.0005 gram-moles per liter of palladium (II) chloride up to the solubility of the salt, with an observed optimum of about 0.080 gram-moles per liter palladium (II) chloride. While the amount of palladium (II) salt may be reduced from the optimum of 0.080 gram-moles per liter, the activity or reaction rate constant "K" also drops. The activity constant may however be retained at a higher level, or prevented from dropping as fast, by the addition of nickel (II) chloride to maintain the total concentration of palladium and nickel at 0.080 gram-moles per liter, as described in application Ser. No. 504,517. The effect of reduced palladium levels on catalytic activity is mitigated by the addition of nickel salts, and has been observed actually to synergistically increase the reaction rate constant of the catalyst composition.

One illustrative catalyst composition (Preparation I) comprises an alumina base supporting a catalytic palladium (II) salt composition. The catalyst is prepared by soaking activated alumina, for about 16 to 24 hours, at room temperature, in an aqueous solution containing palladium (II) chloride, copper (II) chloride, and copper (II) sulfate. The excess solution is removed by filtration. The impregnated alumina is air dried for at least 24 hours and is then activated by oven treatment for about 2 hours at about 200° C.

An excess of aqueous impregnating solution is added and then later filtered off. The raffinate is recovered for future batches. It is also possible simply to add just enough aqueous impregnating solution to make a semi-moist paste with the alumina (typically about 30 cc of aqueous solution to 50 g of a fine mesh alumina). This material is then dried and activated. Generally, "paste" catalysts formed in this manner have not been found to be as active for CO, $H_2S$ and HCN oxidation as the corresponding soak catalysts. They have surprisingly, however, been found to be highly effective in reducing ozone concentrations in air as described in copending application of Victor F. Zackay and Donald R. Rowe, Ser. No. 508,856 filed June 29, 1983 for "Method For Removing Ozone From Dilute Concentrations In Air At Room Temperatures".

Hydrogen Sulfide ($H_2S$) is effectively removed by the above described catalyst (Preparation I) at ambient temperatures ranging generally from $-20°$ C., more generally 10° C. to 50° C. and as high as about 85° C., with a k factor greater than 40 sec. $^{-1}$. Hydrogen cyanide is effectively removed with no detectable output by contact with the above described catalysts at temperatures ranging from $-20°$ C. and more generally about 10° C. to 50° C. up to 85° C. and as high as up to 400° C. Ozone is effectively decomposed with a k factor of greater than 20 sec $^{-1}$ by a "paste" type catalyst produced as described above at ambient temperatures, generally in the range of 10°C. to 50° C., and in the broader range $-20°$ C. to 85° C.

Hydrogen Sulfide

The standard analytical procedure for quantitatively measuring low levels of $H_2S$ in air, is the "methylene blue" method (M. B. Jacobs, M. M. Braveman and S. Hockheiser, Analytical Chemistry, 29, 1349 (1957) which for a threshold colorimeter reading of 0.005 AU provides a threshold analytical sensitivity of 0.05 ng/cc. An activated alumina support (3.00 g), without catalyst, was subjected to a 60-minute run with air containing, on the average, 8.65 ng/cc hydrogen sulfide. The average of quadruplicate analyses of effluent air after 30, 40, 50 and 60 minutes showed 9.10 ±0.8 ng/cc, indicating no removal at all, within the limits of precision of the test.

A parallel run with 3.00 g of catalyst, prepared by using Preparation I, at 26° C., with influent air averaging 5.34 ng/cc $H_2S$ showed no trace of $H_2S$ in the effluent air stream after the first 10 minutes, indicating a removal of better than 99%. Two additional runs were made, using 2.00 g of the alumina based catalyst, and extending run times to 120 minutes. Again, no trace of $H_2S$ was detected in any of the effluent air samples analyzed. Data for all of these runs are given in Table 1.

This catalyst is extremely effective for the removal of $H_2S$ as a minor contaminant of air, and it efficiently reduces the $H_2S$ level in air to far below the upper permissible limit. With an analytical method which is sensitive at least to 0.05 ng/cc (0.06 ppm), $H_2S$ could not be detected in the effluent gases. As the data show (Table 1), the activated alumina support, by itself, had no significant effect upon $H_2S$ in air.

An optical microscopic examination of catalyst after a two-hour run shows very small particles which may be elemental sulfur. This is the expected product for an oxidation catalyst:

$$2H_2S + O_2 \rightarrow 2H_2O + 2S$$

TABLE 1

| | | | | | | | |
|---|---|---|---|---|---|---|---|
| | | | The Catalytic Removal of Hydrogen Sulfide from Air | | | | |
| Run | Catalyst | Charge g. | Contact Time millisec | Initial concn. ng/cc | Final concn. ng/cc | Percent H2S removed | K (sec$^{-1}$) |
| 1 | activated alumina | 3.00 | 198. | 8.65 | 9.10 + 0.82 | nil | 0.0 |
| 2 | Pd(II) | 3.00 | 324 | 5.34 | 0.05 | 99% | 21. |
| 3 | Pd(II) | 2.00 | 206 | 8.32 | 0.05 | 99% | 44. |
| | | | 210 | 7.77 | 0.05 | 99% | 44. |
| 4 | Pd(II) | 2.00 | 207 | 8.38 | 0.05 | 99% | 44. |
| | | | 210 | 7.96 | 0.05 | 99% | 44. |

Hydrogen Cyanide

For test purposes, hydrogen cyanide (HCN) was obtained as a mixture of 1.06% HCN in helium. The HCN-helium gas stream was mixed with about 8% moist air and the mixture passed through a 4.00-g charge of a catalyst of the type described above as Preparation I, and placed in a Lindberg tube furnace. A bypass line accessed by gastight teflon valves permitted the HCN-helium-air mixture to be routed around the furnace and catalyst bed, to permit analysis of the untreated gas mixture. The gas line downstream of the bypass loop was vented to an exhaust hood. A portion of this downstream gas was connected to the sampling valve assembly of a gas chromatograph and to a gas scrubbing assembly charged with 2% aqueous NaOH solution. Gas chromatographic analysis with a digital integrator was used to measure reduction in area of HCN peak (16.3–16–4 min). Titrimetric analysis of the NaOH solution was made after three minutes' sparging of the mixed gas stream, during which time the HCN was collected in the solution as NaCN. Cyanide was assayed by the Liebig procedure using a standard silver nitrate solution.

The results of this series of analyses, conducted over a period of six hours (during which 82 mg-moles of HCN was passed over the same 4 g. catalyst sample), are shown in Table 2.

The first three sets of data are in the bypass mode, in which the gas mixture flows through the system but does not come into contact with the catalyst. Analysis by GC peak area indicates a loss of 0–6% HCN. Analysis by Liebig titration indicates a loss of 0.1–0.3% HCN. These are 'blank' runs, indicating that both analytical methods are operating fairly well and that the HCN is not being removed by other components of the apparatus.

The next two sets of data show the results of passing the gas mixture through the catalyst, then analyzing the downstream gas by GC. The GC integrator response is sensitive to 100 "units", and GC detector response factor for HCN is 100 "units" per 7.8 ppm HCN. In both cases the HCN peak response was zero, indicating less than 8 ppm in the effluent stream, or a removal efficiency of about 99.9%.

The next three runs are repeats at 100° and 250° C., again showing no detectable HCN in the effluent, or an indicated removal efficiency of about 99.9%.

TABLE 2

The Catalytic Removal of Hydrogen Cyanide from Helium-Air Mixtures

| Gas Flow (cc/sec) | | | Contact time millisec | HCN, ppm | | | | | |
|---|---|---|---|---|---|---|---|---|---|
| HCN/He | Air | Total | | Upstream Estimate | Downstream detn | Method | % Removed | K, sec$^{-1}$ | Temp °C. |
| 8.23 | nil | 8.23 | — | 10,600 | (10,600) | GC | none | — | 25° |
| 8.23 | 0.60 | 8.83 | — | 9,880 | 9,776 | GC | 1.% | — | 25° |
| | | | | | 9,873 | Liebig | 0.1% | — | 25° |
| 8.20 | 0.60 | 8.80 | — | 9,877 | 9,283 | GC | 6.% | — | 25° |
| | | | | | 9,847 | Liebig | 0.3% | — | 25° |
| 8.10 | 0.70 | 8.80 | 273 | 9,757 | 8 | GC | 99.% | 27. | 25° |
| 7.82 | 1.35 | 9.17 | 262 | 9,039 | 8 | GC | 99.% | 27. | 25° |
| 8.23 | 0.60 | 8.83 | 272 | 9,880 | 8 | GC | 99.% | 26. | 100° |
| 8.23 | 0.60 | 8.83 | 272 | 9,880 | 8 | GC | 99.% | 26. | 250° |
| 8.23 | 0.60 | 8.83 | 272 | 9,880 | 8 | GC | 99.% | 26. | 250° |
| 8.23 | 0.60 | 8.83 | 272 | 9,880 | 8 | GC | 99.% | 26. | 400° |
| | | | | | 159 | Liebig | 98.5% | 15. | 400° |
| 8.23 | 0.60 | 8.83 | 272 | 9,880 | 8 | GC | 99.% | 26. | 400° |
| | | | | | 168 | Liebig | 98.4% | 15. | 400° |

The last two runs, at 400° C., were analyzed both by GC (again no detectable HCN) and by Liebig titration (indicating a small amount of silver-precipitating anion which could represent a HCN removal efficiency as low as 98.5%).

The Liebig titration data at 400° may be showing precipitation of silver ion by carbonate, arising from the CO$_2$ formed by the oxidative destruction of HCN. The right-hand columns in Table 2 assume, however, the "worst construction" on the Liebig data, i.e., that everything which precipitates silver ion is unreacted HCN. Even so, these data show extremely high catalytic conversions of HCN, in agreement with the GC analyses, and showing total loss of the HCN peak in effluent gas passed through the catalyst tube. These data provide strong evidence for the effective removal of HCN from air mixtures at both ambient and elevated temperatures. The indicated rate constants at room temperature are at least 15 sec $^{-1}$ (Liebig titration data) or at least 26 sec $^{-1}$ (GC analysis).

While an illustrative method embodying the present invention has been described in detail, it should be understood that the nature of scope of the invention is limited only by the scope and limit of the appended claims.

I claim:

1. The method of removing the gases hydrogen sulfide or hydrogen cyanide and mixtures thereof from highly dilute concentrations in air, comprising contacting the gas and air mixture with a dry, activated catalyst comprising a palladium (II) salt and a copper (II) salt on a support.

2. The method defined in claim 1 wherein said support is an alumina support.

3. The method defined in claim 2 wherein said palladium salt is present in a concentration of about 0.03 gram-atoms palladium per kilogram of alumina.

4. The method of claim 1 wherein the gases and air mixture is contacted with the catalyst at a temperature in the range of about −20° C. to about +85° C.

5. The method of oxidizing hydrogen sulfide to elemental sulfur and water comprising contacting gaseous hydrogen sulfide in air with a dry, activated oxidation catalyst comprising a water soluble palladium (II) salt and a copper (II) salt on an activated alumina support, at a temperature from about −20° C. to about 85° C.

6. A method of oxidizing hydrogen cyanide to carbon dioxide, water and nitrogen oxides comprising contacting gaseous hydrogen cyanide in air with a dry, activated oxidation catalyst comprising a water soluble palladium salt (II) and a copper (II) salt on an activated alumina support, at a temperature in the range from about 0° C. to about 400° C.

* * * * *